United States Patent [19]

Frankenberg

[11] 4,237,771
[45] * Dec. 9, 1980

[54] PNEUMATICALLY OPERATED ACTUATOR AND METHOD OF MAKING THE SAME

[75] Inventor: Alfred A. Frankenberg, Knoxville, Tenn.

[73] Assignee: Robertshaw Controls Company, Richmond, Va.

[*] Notice: The portion of the term of this patent subsequent to Dec. 18, 1996, has been disclaimed.

[21] Appl. No.: 53,023

[22] Filed: Jun. 28, 1979

Related U.S. Application Data

[62] Division of Ser. No. 864,374, Dec. 27, 1977, Pat. No. 4,178,837.

[51] Int. Cl.³ .................... F15B 13/16; F01B 19/00; F16J 3/02
[52] U.S. Cl. .................... 91/387; 92/130 D; 92/99; 403/242
[58] Field of Search .................... 91/387, 386; 92/132, 92/130 D, 99; 403/242, 400

[56] References Cited

U.S. PATENT DOCUMENTS

| | | | |
|---|---|---|---|
| 2,557,627 | 6/1951 | Baril | 403/400 |
| 2,966,891 | 1/1961 | Williams | 91/387 |
| 3,172,336 | 3/1965 | Warstler | 91/387 |
| 3,490,341 | 1/1970 | Sessody | 92/132 |

FOREIGN PATENT DOCUMENTS 1237149 6/1971 United Kingdom .................... 403/242

Primary Examiner—Paul E. Maslousky
Attorney, Agent, or Firm—Candor, Candor & Tassone

[57] ABSTRACT

A method of making a pneumatically operated actuator having a pneumatically operated movable wall interconnected by a feedback tension spring to a pilot valve positioner that is adapted to pneumatically operate the movable wall of the actuator in relation to a pneumatic signal directed to the positioner, the method including the steps of loosely projecting one end of the spring through an opening in the wall after the other end of the spring has been interconnected to the pilot valve positioner and pulling on the one end of the spring while directing a predetermined pneumatic signal to the positioner so that the wall will assume a position thereof relative to the one end of the spring and the actuator that corresponds to the predetermined pneumatic signal whereby the one end of the spring can be secured to the wall while the wall is in that position thereof and the spring is in the pulled condition thereof that caused the wall to move to such position.

7 Claims, 1 Drawing Figure

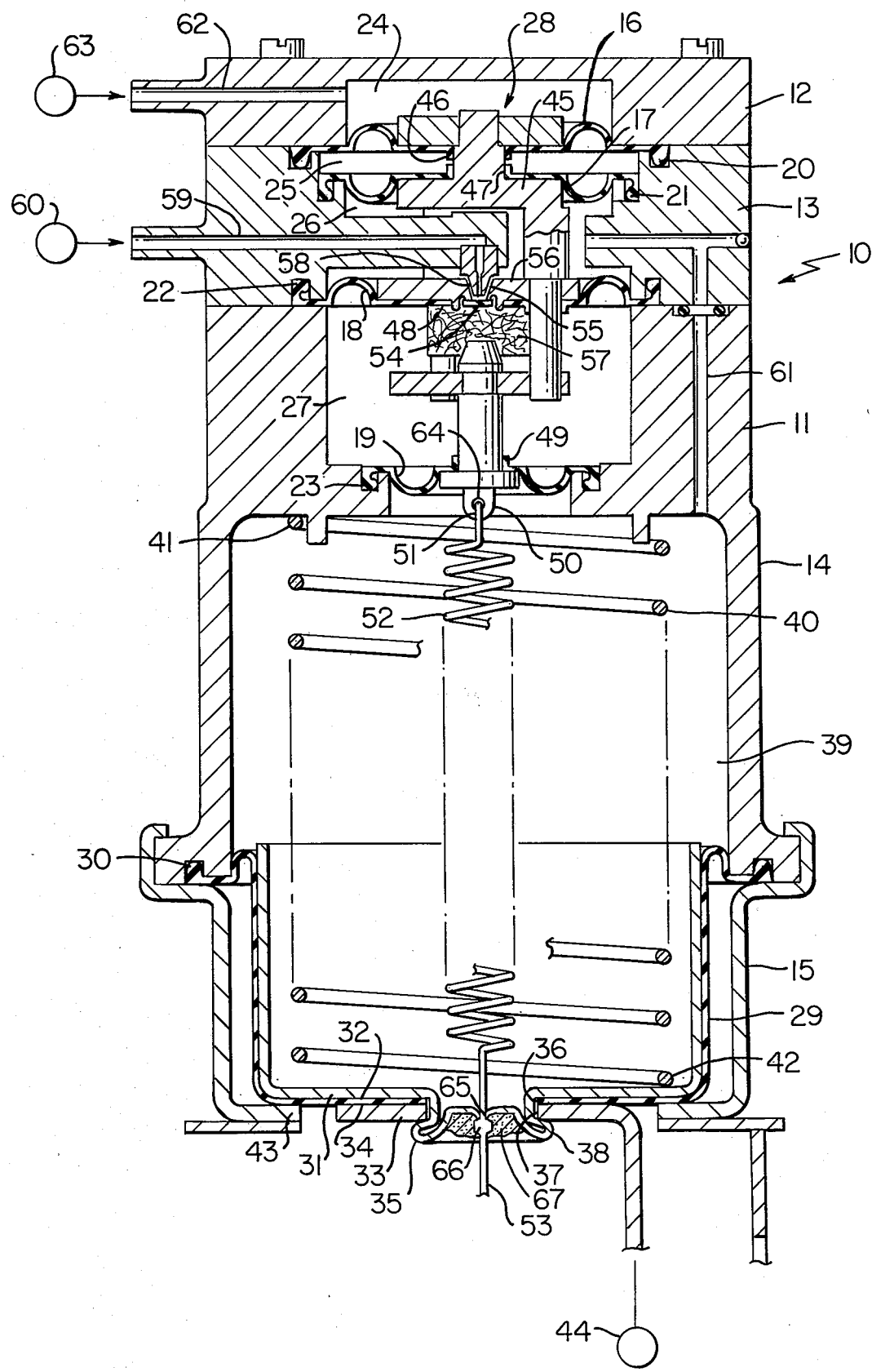

PNEUMATICALLY OPERATED ACTUATOR AND METHOD OF MAKING THE SAME

CROSS-REFERENCE TO RELATED APPLICATION

This application is a divisional patent application of its copending parent application, Ser. No. 864,374, filed Dec. 27, 1977, now U.S. Pat. No. 4,178,837.

BACKGROUND OF THE INVENTION

1. Field of the Invention

This invention relates to a pneumatically operated actuator and to a method of making the same.

2. Prior Art Statement

It is known to make a pneumatically operated actuator having a pneumatically operated movable wall interconnected by a feedback tension spring to a pilot valve positioner that is adapted to pneumatically operate the movable wall of the actuator in relation to a pneumatic signal directed to the positioner.

For example, see the following item:

(1) Piston Actuator with positioner, Model No. M504-11, manufactured by the Fulton Sylphon Division of Robertshaw Controls Company and depicted in the U.S. Pat. No. 3,172,336, to Warstler.

It appears that the end of the feedback tension spring that is secured to the movable wall of the actuator of item (1) above is adjustably secured to the wall so that calibration of the actuator can take place through a changing of the threaded relation of a part on the one end of the spring and an adjusting means carried by the movable wall.

SUMMARY OF THE INVENTION

It is one feature of this invention to provide a simplified structure and method for calibrating the feedback tension spring of a pneumatically operated actuator during the making of such actuator.

In particular, one embodiment of this invention provides a method of making a pneumatically operated actuator having a pneumatically operated movable wall interconnected by a feedback tension spring to a pilot valve positioner that is adapted to pneumatically operate the movable wall of the actuator in relation to a pneumatic signal directed to the positioner, the method of this invention including the steps of loosely projecting one end of the spring through an opening in the wall after the other end of the spring has been interconnected to the pilot valve positioner, directing a predetermined pneumatic signal to the positioner, pulling on the one end of the spring until the wall moves relative to the one of the spring and—; after "to" insert —the one end of the spring and assumes a position thereof relative to the actuator that corresponds to the predetermined pneumatic signal, and securing the one end of the spring to the wall while the wall is in that particular position thereof and the spring is in the pull condition thereof that caused the wall to move to that particular position thereof.

Accordingly, it is an object of this invention to provide an improved method of making a pneumatically operated actuator, the method of this invention having one or more of the novel features of this invention as set forth above or hereinafter shown or described.

Another object of this invention is to provide an improved pneumatically operated actuator having one or more of the novel features of this invention as set forth above or hereinafter shown or described.

Other objects, uses and advantages of this invention are apparent from a reading of this description which proceeds with reference to the accompanying drawing forming a part thereof and wherein:

BRIEF DESCRIPTION OF THE DRAWING

The FIGURE of a drawing illustrates in cross section the pneumatically operated actuator of this invention as made by the method of this invention.

DESCRIPTION OF THE PREFERRED EMBODIMENT

While the various features of this invention are hereinafter described and illustrated as being particularly adapted to provide a pneumatically operated actuator for positioning a heat exchanger part of a transportation vehicle in relation to sensed temperature, it is to be understood that the various features of this invention can be utilized singly or in any combination thereof to provide a pneumatically operated actuator for other uses as desired.

Therefore, this invention is not to be limited to only the embodiment illustrated in the drawing, because the drawing is merely utilized to illustrate one of the wide variety of uses of this invention.

Referring now to the drawing, the improved pneumatically operated actuator of this invention as made by the method of this invention is generally indicated by the reference numeral 10 and comprises a housing means 11 formed from a plurality of housing parts 12, 13, 14 and 15 secured together in any suitable manner.

A plurality of flexible diaphragms 16, 17, 18 and 19 respectively have their outer peripheral portions 20, 21, 22 and 23 secured to the housing means 11 to divide the same into a plurality of chambers 24, 25, 26 and 27 separated from each other and cooperating together in a manner hereinafter set forth to define a pilot valve positioner of the actuator that is generally indicated by the reference numeral 28.

The actuator 10 includes a main flexible diaphragm 29 having its outer periphery 30 secured between the cooperating housing parts 14 and 15 as illustrated, the flexible diaphragm 29 comprising a movable wall of the actuator 10 and having a rigid backup cup 31 disposed on one side 32 thereof and an actuating arm 33 disposed on the other side 34 thereof as illustrated, the cup 31 having a portion 35 projecting through aligned openings 36 and 37 of the diaphragm 29 and actuator arm 33 to be fastened thereto by a bending or staking over of a portion 38 of the projecting part 35 as illustrated.

The main diaphragm 29 cooperates with the housing means 11 to define a chamber 39 that is defined in part between the main diaphragm 29 and the diaphragm 19 which performs the function of isolating the pilot valve positioner 28 from the main chamber 39 as will be apparent hereinafter.

A compression spring 40 is disposed in the chamber 39 and has one end 41 bearing against the housing means 11 while the other end 42 thereof bears against the backing cup 31 so that the force of the compression spring 40 tends to move the movable wall 29 to its fully extended condition as illustrated in the drawing against a stop portion 43 of the housing means 11 whereby the actuator arm 33 is in its fully extended position to operate any suitable device, such as the device 44 illustrated in the drawing and comprising a settable part of a heat exchanger means of an automobile heat exchanger system disclosed and claimed in the co-pending patent application, Ser. No. 864,455, filed Dec. 27, 1977.

The pilot valve positioner 28 includes a movable rigid interconnection means 45 effectively secured to the inner peripheries 46, 47, 48 and 49 of the diaphragm 16, 17, 18 and 19 as illustrated and has a portion 50 projecting through the isolating diaphragm 19 into the main chamber 39 to be interconnected to one end 51 of a coiled tension feedback spring 52 having another end 53 secured to the movable wall 29 of the actuator 10 by the method of this invention in a manner hereinafter set forth whereby the force of the feedback tension spring 52 tends to pull downwardly in the drawing on the interconnection means 46 of the pilot valve positioner 28 for a purpose hereinafter described with a force that varies in relation to the position of the movable wall 29 relative to the actuator 10.

The interconnection means 46 carries a movable valve member 54 that is normally urged to a position to close an opening 55 passing through a portion 56 of the interconnection means 45 by a porous compressible filter member 57 carried by the interconnection means 45 in the manner illustrated.

The housing part 13 has a stationary valve seat 58 that projects into the opening 55 of the interconnection means 45 and is adapted to be closed by the valve member 54 when the valve member 54 is disposed thereagainst, the valve seat 58 being interconnected to a passage 59 of the housing means 11 that is adapted to be interconnected to a pneumatic source, such as the vacuum source 60 illustrated in the drawing.

In this manner, when the movable interconnecting means 45 moves downwardly in the drawing to move the valve member 54 away from the valve seat 58, the vacuum source 60 will be interconnected to the chamber 26 to evacuate the same, the chamber 26 comprising a branch chamber or output chamber of the pilot valve positioner 28 as will be apparent hereinafter.

Conversely, when the interconnection means 45 moves upwardly in the drawing a certain distance, the valve seat 58 will be projected into the opening 55 a distance sufficient to unseat the valve member 54 away from the opening 55 so that the opening 55 interconnects the chamber 27 through the filter 57 to the output chamber 26 to permit air from the chamber 27 to bleed into the output chamber 26 for a purpose hereinafter described, the chamber 27 being interconnected to the atmosphere through any suitable vent means (not shown) in the housing means 11.

Similarly, the chamber 26 between the diaphragms 16 and 17 is adapted to be interconnected to the atmosphere through a suitable vent means (not shown) formed in the housing means 11.

The output chamber 26 is also fluidly interconnected to the main chamber 39 of the actuator 10 by passage means 61 formed in the housing means 11 for a purpose hereinafter described.

The chamber 24 of the pilot valve means 28 is adapted to be interconnected by a passage 62 to any suitable pneumatic signal sending device, such as the device 63 which tends to create a vacuum in the chamber 24 of a valve that corresponds to a desired output temperature effect that the heat exchanger means 44 is to produce as will be apparent hereinafter.

When a vacuum is created in the chamber 24, the resulting pressure differential acting across the diaphragm 16 tends to pull the interconnecting means 45 upwardly.

In contrast, the vacuum is the output chamber 26 creates a pressure differential across the diaphragm 17 that tends to pull the interconnection means 45 downwardly.

Likewise, a vacuum being created in the main chamber 39 will result in a pressure differential not only acting across the main diaphragm 29 to pull the main diaphragm 29 upwardly in the drawing, but the same also creates a pressure differential across the diaphragm 19 tending to pull the interconnection means 45 downwardly.

By making the main effective area (MEA) of the diaphragm 18 that is exposed to the chamber 26 substantially equal to the sum of the main effective area of the diaphragm 17 and the main effective area of the diaphragm 19, the movement of the interconnection means 45 will only be influenced by the pressure differential acting across the diaphragm 16 and the force of the feedback spring 52 as will be apparent hereinafter.

During the making of the pneumatically operated actuator 10 of this invention, the end 51 of the feedback tension spring 52 is fastened to the end 50 of the interconnection means 45, such as by having the end 51 hooked through an opening 64 in the end 50 of the interconnecting means 45 as illustrated.

Thereafter, the other end 53 of the tension spring 52 is loosely projected through an opening 65 formed in the part 35 of the cup 31 of the movable wall 29 to the exterior of the chamber 39 thereof as illustrated.

A particular vacuum signal is then directed to the chamber 24 of the pilot valve means 28 that should cause the movable wall 29 to assume a certain position relative to the housing means 11 for that particular signal as will be apparent hereinafter.

Thus, with that particular vacuum signal being imposed in the chamber 24 of the actuator 10, the end 53 of the tension spring 52 is pulled downwardly in the drawing until the movable wall 29 is moved by the pilot valve means 28 in a manner hereinafter described relative to the end 53 of the spring 52 and the actuator 10 to the required position that the movable wall 29 is to assume for that particular vacuum signal in the chamber 24.

At this time, the end 53 of the pulled spring 52 is fastened to the wall 29 while the wall 29 is at the required position thereof for a particular vacuum value in the chamber 24 and this is accomplished by forming an abutment 65 on the end 53 of the tension spring 52 outboard of the opening 65 so that the abutment 66 cannot be pulled through the opening 65 whereby the end 53 of the spring 52 is secured to the movable wall 29 and the tension spring 52 is imposing the proper feedback force on the interconnecting means 45 to cause the pilot valve positioner 28 to position the movable wall 29 at the proper position thereof when that particular vacuum signal is being created in the chamber 24.

Thus, it can be seen that the unique method steps of this invention readily permit the tension spring 52 to be calibrated during the making of the pneumatically operated actuator 10 of this invention.

Because the tension spring comprises a coiled wire member, the abutment 66 on the end 53 thereof can be readily made by merely flattening the wire that forms the tension spring 52 and at least part of the excess of the end 53 of the spring 52 that extends beyond the abutment 66 then can be cut off as desired.

After the abutment 66 has been made in the above manner, a suitable sealing compound 67 can be disposed on the end 53 of the spring 52 and the part 35 of the backing cup 31 to seal the opening 65 so that the chamber 39 is sealed from the exterior of the wall 29 by the sealing means 67.

Thus, it can be seen that the method of this invention readily permits the pneumatically operated actuator 10 of this invention to be made in the configuration illustrated in the drawing to operate in a manner now to be described.

When the signal directing means 63 increases the value of the vacuum signal being directed to the chamber 24 of the pilot valve positioner 28, the resulting increase in the pressure differential acting across the diaphragm 16 pulls the diaphragm 16, and, thus, the interconnecting means 45, upwardly in the drawing to cause the stationary valve seat 56 to move the valve member 54 away from the opening 55 in its upwardly moving part 56 so that air is adapted to bleed into chamber 26 and decrease the vacuum valve therein. Such reduction in the vacuum value in the chamber 26 is transmitted by the passage 61 to the chamber 39 so that there is a resulting loss in pressure differential acting across the diaphragm 29 whereby the compression spring 40 moves the movable wall 29 and actuator arm 33 downwardly in the drawing to change the condition of the heat exchanger means 44 to produce a different output effect thereof.

However, such downward movement of the movable wall 29 also pulls downwardly on the feedback tension spring 52 so that the feedback spring 52 pulls downwardly on the interconnection means 45 with a greater force to again cause the valve member 54 to close the opening 55 as the portion 56 of the interconnection means 45 is moved downwardly a sufficient distance to permit the filter material 57 to move the valve member 54 against the opening 55 whereby the pneumatically operated actuator 10 is rebalanced to the new condition thereof.

Conversely, should the signal sensing device 63 decrease the value of the vacuum signal being directed to the chamber 24 of the actuator 10, the resulting drop in pressure differential now acting across the diaphragm 16 permits the feedback spring 52 to pull the interconnection means 45 downwardly to thereby move the valve member 54 away from its position closing the valve seat 58 so that the now opened valve seat 58 interconnects the vacuum source 60 to the chamber 26 to increase the vacuum value in the chamber 26 and, thus, increase the vacuum value in the main chamber 39 to cause the movable wall 29 to be moved upwardly in opposition to the force of the compression spring 40 to set the heat exchanger 44 to a different condition thereof.

As the movable wall 29 is being moved upwardly in the drawing, the force of the tension spring 52 is being decreased so that the pressure differential acting across the diaphragm 16 is now sufficient to pull the interconnection means 45 upwardly to close the value member 54 against the value seat 58 and thereby rebalance the system.

Therefore, it can be seen that the actuator 10 will operate the device 44 in accordance with the value of the signal being directed to the pilot chamber 24 of the pilot valve means 28 by the signal directing device 63.

Accordingly, it can be seen that this invention provides an improved pneumatically operated actuator and a method of making such actuator.

While the form and method of this invention now preferred have been illustrated and described as required by the Patent Statute, it is to be understood that other forms and method steps can be utilized and still fall within the scope of the appended claims.

What is claimed is:

1. In a pneumatically operated actuator having a housing means provided with a pneumatically operated movable wall interconnected by a feedback tension spring to a pilot valve positioner that is adapted to pneumatically move said movable wall of said actuator in relation to a pneumatic signal directed to said positioner and in opposition to a biasing means of said wall, said wall having an opening therethrough through which one integral end of said spring projects, the improvement wherein said one integral end of said spring outboard of said opening has an integral abutment of a size that prevents said abutment from passing through said opening under the force of said spring, said movable wall comprising a flexible diaphragm and a cup-shaped backing member having a closed end provided with said opening therethrough and against which said abutment engages.

2. A pneumatically operated actuator as set forth in claim 1 wherein said tension spring comprises a coiled wire and said abutment comprises an integral flat portion of said one integral end of said coiled wire.

3. A pneumatically operated actuator as set forth in claim 1 wherein said flexible diaphragm has an opening therethrough, said closed end of said cup-shaped backing member having a portion thereof projecting through said opening of said diaphragm, said portion of said backing member having said opening through which said one end of said spring projects.

4. A pneumatically operated actuator as set forth in claim 3 wherein said portion of said backing member secures said backing member to said diaphragm.

5. A pneumatically operated actuator as set forth in claim 4 wherein said portion of said backing member has an annular part turned outboard to secure said backing member to said diaphragm.

6. A pneumatically operated actuator as set forth in claim 5 and including an actuator arm having a section thereof held in stacked relation between said diaphragm and said annular part of said backing member whereby said actuator arm moves in unison with said movable wall.

7. A pneumatically operated actuator as set forth in claim 5 wherein said annular part of said portion of said closed end of said backing member defines a cavity surrounding said opening of said portion, and sealing means disposed in said cavity to seal said abutment to said opening of said portion of said backing member.

* * * * *